United States Patent [19]

Schlueter

[11] Patent Number: 4,483,131
[45] Date of Patent: Nov. 20, 1984

[54] TRACTOR-MOUNTED HARVESTER

[75] Inventor: Francis E. Schlueter, Des Moines, Iowa

[73] Assignee: Deere & Company, Moline, Ill.

[21] Appl. No.: 453,435

[22] Filed: Dec. 27, 1982

[51] Int. Cl.³ .............................................. A01D 46/08
[52] U.S. Cl. ........................................ 56/15.6; 56/28; 56/DIG. 9; 280/760
[58] Field of Search ................... 56/15.6, 28, 30, 211, 56/228, 328 R, 327 R, DIG. 9, 10.1; 280/760

[56] References Cited

U.S. PATENT DOCUMENTS

| | | | |
|---|---|---|---|
| 2,936,562 | 5/1960 | Sawyer | 56/14 |
| 2,947,571 | 8/1960 | Hagen | 56/28 |
| 3,159,956 | 12/1964 | Green et al. | 56/DIG. 9 |
| 3,641,747 | 2/1972 | Bobard | 56/DIG. 9 |
| 4,348,856 | 9/1982 | Copley et al. | 56/30 |

FOREIGN PATENT DOCUMENTS 164539  5/1952  Austria ................. 56/15.6

Primary Examiner—Robert P. Swiatek
Assistant Examiner—John G. Weiss

[57] ABSTRACT

A mounting and dismounting system for a rear-mounted cotton harvester or similar implement which permits the tractor to be removed from under the crop receptacle without utilizing a hoist or other large equipment. By attaching dismounting stands to the rear cross auger frame and to the rear lift frame assembly, the rear basket posts which normally are connected to the tractor axle can be lifted therefrom by extending the hydraulic cylinders connected to the rear lift frame assembly. The front basket support posts are unpinned from the forward frame of the basket, and as the rear basket posts tilt rearwardly, the basket is lifted to provide clearance in the forward direction. The tractor can then be driven out from under the basket. An extension hose is connected to the lift cylinders so that they remain connected to the source of pressure on the tractor as the tractor is driven forwardly. Once the tractor has cleared the basket assembly, the front basket posts are reattached to the basket and the pressure in the cylinders is released so that the basket tilts downwardly and rests on the posts for storage. The procedure is reversed for mounting the harvester.

38 Claims, 4 Drawing Figures

TRACTOR-MOUNTED HARVESTER

BACKGROUND OF THE INVENTION

This invention relates generally to tractor-mounted implements, and more specifically to a method and apparatus for mounting and dismounting a tractor-mounted harvester.

Many types of agricultural harvesters are available which are adapted for mounting on and dismounting from a tractor or other mobile vehicle. Often, such harvesters include a receptacle or similar structure carried above the tractor. For example, cotton harvesters which include row units connected to the tractor chassis and a cotton receptacle or basket supported on posts above the tractor, have been available for some time. The tractor-mounted harvesters are relatively bulky and complex, and a considerable amount of time is required to mount them on the tractor for harvesting and to dismount them after the harvest season is over. Installing or removing the baskets and row units requires a hoist, and since many farmers do not have the equipment necessary, they must have the implement dealer mount the harvester at the beginning of the harvest season and remove it when the harvest season is complete. These tasks are relatively time-consuming and expensive. The farmer must dedicate a tractor to the harvester during an entire harvesting season since it is impractical to remove the harvester for short periods of time to free the tractor for other uses.

Recently, rear-mounted cotton harvesters have been developed for mounting on a tractor, these harvesters have reduced the task of mounting the row units to the tractor. Such a harvester, which is shown by way of example in U.S. Pat. No. 4,348,856, still requires a hoist to remove the basket, and therefore the average cotton farmer still does not have the capability of installing or removing the entire harvester without the help of a dealer. Some disassembly of the rear-mounted harvester is usually necessary, and this requires additional time and effort on the part of the farmer.

It is therefore an object of the present invention to provide an improved method and apparatus for installing a harvester on, and removing a harvester from, a tractor or similar vehicle. It is a further object to provide such a method and apparatus which obviates use of a hoist or other type or large equipment not readily available to the average farmer.

It is another object of the present invention to provide a method and apparatus for mounting and dismounting a tractor-mounted harvester which reduces the time and number of steps required to accomplish each operation, and which permits the farmer to mount and dismount the implement without expensive tools or equipment, or additional man power.

It is another object of the invention to provide a method and apparatus for mounting and dismounting a tractor-mounted harvester which requires very little disassembly of the harvester.

It is yet another object of the invention to provide a method and apparatus for mounting and dismounting a tractor-mounted harvester wherein the hydraulics on the harvester are utilized to orient portions of the assembly in non-interfering relationship with the tractor body and cab to permit the tractor to be driven out from under the harvester.

It is a further object to provide an improved method and apparatus for mounting and dismounting an overhead crop receptacle of a tractor-mounted harvester.

In accordance with the above objects, the present invention includes a mounting and dismounting system for a rear-mounted cotton harvester or similar implement which permits the tractor to be removed from under the crop receptacle without utilizing a hoist or other large equipment. By attaching dismounting stands to the rear cross auger frame and to the rear lift frame assembly, the rear basket posts which normally are connected to the tractor axle can be lifted therefrom by extending the lift cylinders connected to the rear lift frame. The front basket support posts are unpinned from the forward frame of the basket, and as the rear basket posts tilt rearwardly, the basket is lifted to provide clearance for the tractor in the forward direction. The tractor can be driven out from under the basket after any remaining hydraulics, power take-off shafts and cables are disconnected. An extension hose is connected to the lift cylinders so that they remain connected to the source of hydraulic pressure on the tractor as the tractor is driven forwardly. Once the tractor has cleared the basket assembly, the front basket posts are reattached to the basket and the pressure in the cylinders is released so that the basket tilts downwardly and rests on the posts as the posts come in contact with the ground. To mount the harvester, the procedure is reversed and the tractor is backed under the basket so that the rear axle is aligned with the rear basket posts. The cylinders are then operated to rock the posts downwardly onto the axles and to level the basket over the tractor. The rear harvesting units remain connected to the remainder of the harvester so that assembly and disassembly time is reduced.

These and other objects, features and advantages of the present invention will become apparent from the description of the preferred embodiment below, and from the drawings.

DESCRIPTION OF THE PREFERRED EMBODIMENT

Figure 1:
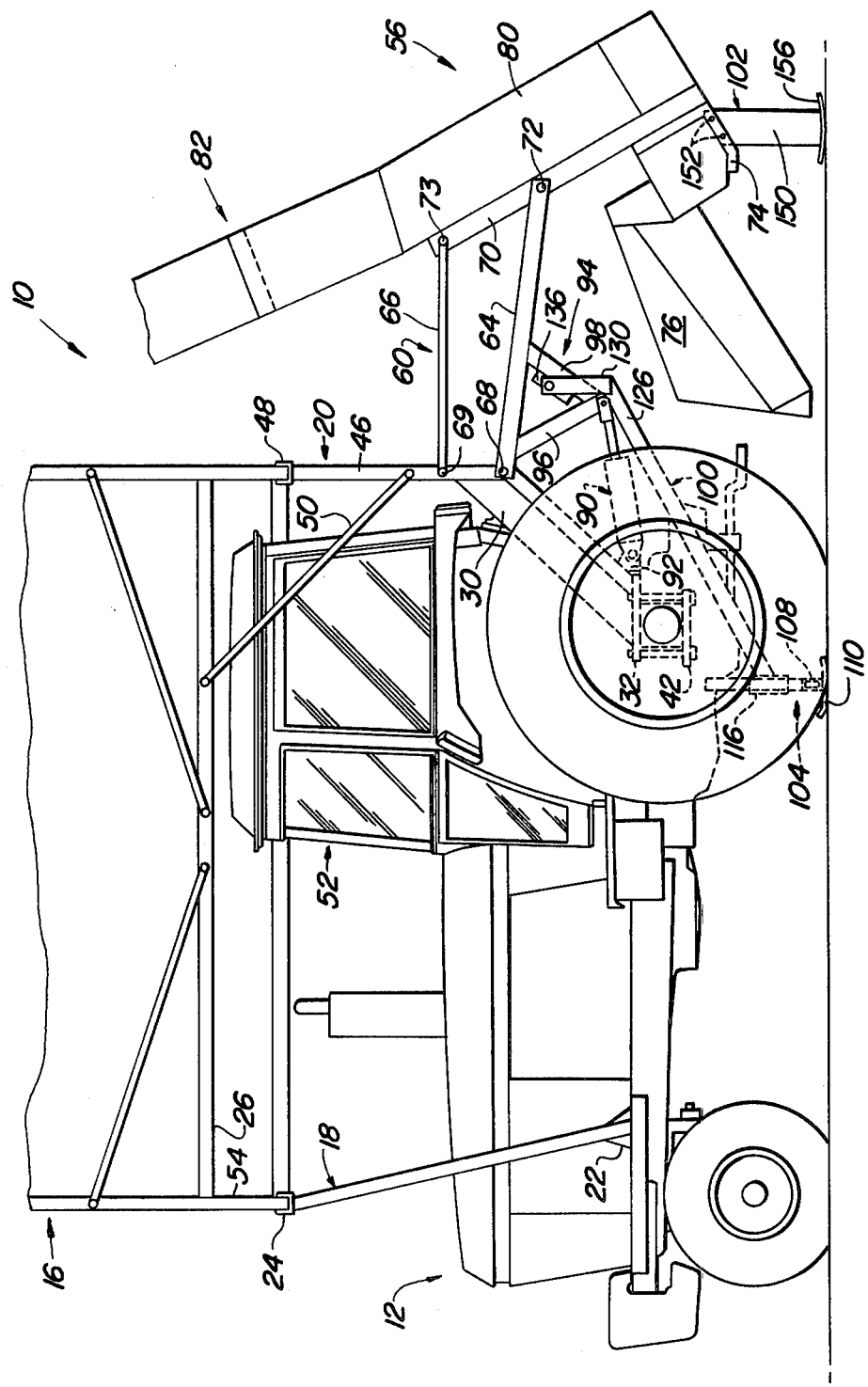
FIG. 1 is a side view of a tractor with a rear-mounted harvester attached thereto and with the dismounting stands of the present invention positioned for use in removing the harvester.

Referring now to FIG. 1, therein is shown a tractor-mounted harvester 10 mounted on a conventional row-crop tractor 12, or other suitable wheeled mobile device. In the embodiment shown in FIG. 1, the harvester 10 is a cotton harvester of the type shown and described in U.S. Pat. No. 4,348,856, although it is to be understood that other types of harvesters could also be used with the present invention. The structure and operation of the harvester 10 will be set forth herein only in sufficient detail to describe the mounting and dismounting system, and reference may be had to the aforementioned patent, incorporated herein by reference, for further details of the harvester.

The harvester 10 includes a fore-and-aft extending crop receptacle or cotton basket 16 supported above the tractor 12 by a pair of transversely spaced forward basket support posts 18 and a pair of rear support posts 20. The front basket support posts 18 include lower ends 22 which are fastened to the front of the body of the tractor 12 by releasable fastening means, such as bolts. The upper end of the posts 18 are releasably pinned at 24 to the front of basket frame 26.

The rear support posts 20 each include a rearwardly and upwardly angled lower support member 30 connected to a horizontal plate member 32 adapted for support on the upper surface of tractor rear drive wheel axle 36. Pairs of bolts 38 and 40 extend through the plate member 32 on opposite fore-and-aft sides of the axle 36 and through a lower plate member 42 to secure each post 20 to the corresponding tractor axle 36. Each rear post 20 includes an upright tubular portion 46 connected at its lower end to the lower support member 30. The upper end of the tube 46 is fixed to the rear portion of the basket frame 26 by a bracket 48 rearwardly of the tractor 12. A diagonal stabilizing member 50 is connected to the central portion of the tube 46 and extends forwardly and upwardly therefrom to a connection with the basket frame 26. The tractor 12 includes a cab 52 which, when the basket 16 is attached (FIG. 1), extends above the lowermost extremity of basket portion 54 directly ahead of the cab.

Figure 4:
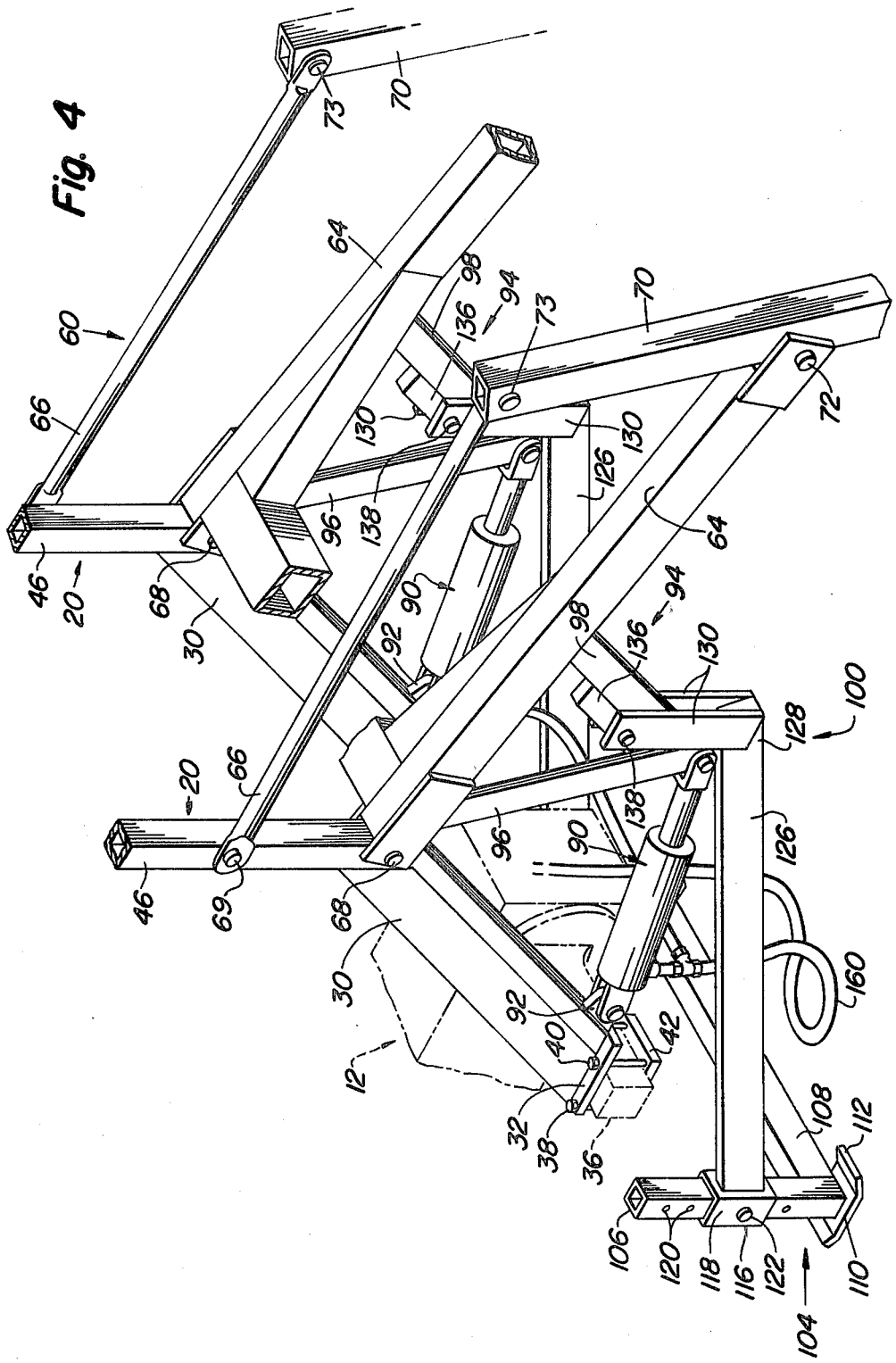
FIG. 4 is a rear perspective view of the rear basket posts and rear lift frame assembly of the harvester of FIG. 1 with the forward dismounting stands connected to the assembly.

Harvesting and conveying structure 56 is connected for support rearwardly of the tractor 12 by a rear lift frame assembly 60 (FIGS. 1 and 4). The rear lift frame assembly 60 includes a pair of main support beams 64 and a pair of upper control links 66 pivotally connected to the rear basket support posts 20 by pins 68 and 69 adjacent the connection of the lower support members 30 with the respective upright tubes 46. The aft ends of the support beams 64 and the control links 66 are pivotally connected to upright support beams 70 by pins 72 and 73. The support beams 70 are fixed to a transverse cross auger frame 74 which supports a plurality of transversely spaced row harvesting units 76 which extend forwardly from the frame 74 and terminate just behind the tractor 12. An air duct system 80 extends upwardly from the cross auger frame 74 to the upper rear portion of the receptacle 16 above and behind the tractor cab 52. The system 80 includes a telescoping portion 82 to accommodate changes in position of the harvesting and conveying portion 56 with respect to the receptacle 16. If further details of the construction and operation of the harvesting and conveying structure 56 is desired, reference may be had to the aforementioned U.S. Pat. No. 4,348,856.

The rear lift frame assembly 60 is connected for rocking with respect to the rear basket posts 20 by conventional power means, preferably a pair of extendable and retractable hydraulic cylinders 90 having their cylinder ends connected to brackets 92 mounted on the respective lower support members 30 adjacent the plate members 32. The rod end of each cylinder 90 is pinned to a cylinder bracket 94 which is connected to the main support beam 64. Each cylinder bracket 94 includes a pair of downwardly converging arms 96 and 98 connected at their lower ends adjacent the rod end of the cylinder 90 and welded at their upper ends to fore-and-aft locations on the respective support beams 64. The cylinders 90 are connected to a source of pressurized fluid on the tractor 12 through a conventional operator-controlled valve for extending and retracting the cylinders 90 to rock the rear lift frame assembly 60 and raise and lower the harvesting and conveying structure 56. The aforedescribed structure, in the preferred embodiment, is generally identical to that described in the aforementioned U.S. Pat. No. 4,348,856, but it is to be understood that the present invention may also be utilized with other types of harvesting structures having an overhead receptacle and harvesting structure which is located generally fore or aft of a tractor or other mobile vehicle.

The structure for mounting and dismounting the harvester 10 from the tractor 12 includes a forward stand assembly 100 selectively attachable to and removable from the cylinder brackets 94 on the lift frame assembly 60, and a plurality of transversely spaced rear stands 102 bolted to the transverse cross auger frame 74. The forward stand assembly 100 includes a base portion 104 having a pair of transversely spaced, upright tubular beams 106 connected at their lower ends to a transverse beam 108. In the preferred embodiment, the length of the transverse beam 108 is selected so that the tubular beams 106 are transversely spaced a distance approximately equal to the transverse spacings between the forward ends of the lower main support beams 64 of the lift frame assembly 60. A generally horizontal plate 110 is welded to the bottom of each tubular beam 106 and includes upturned corners 112. A tubular bracket 116 is slidably received over each of the tubular beams 106 and includes apertured side portions 118. Apertures 120 in the sides of the tubular beams 106 are aligned with the aperture in the sides 118, and a pin 122 is inserted through the apertures to fix the tubular bracket 116 with respect to the tubular beam 106 at a preselected adjusted position. An elongated diagonal beam 126 is welded at its lower end to each bracket 116 and extends rearwardly and upwardly therefrom to an upper end 128 having welded thereto on either side a pair of upwardly extending, transversely spaced plate members 130. The plate members 130, when the stand assembly 100 is connected to the lift frame assembly 60, extend upwardly on either side of the arm 98 of the cylinder bracket 94. The plate members 130 are held in position about the arm 98 by a keeper block 136 which is pinned to the plate members 130 by a pin 138 (FIG. 4) extending through the members and through an aperture in the central portion of the block 136. The rod end of the cylinder 90 bears against the plate members 130 when the forward stand assembly 100 is attached and the cylinder is extended, so that the stand assembly 100 is urged in the counterclockwise direction as viewed in FIGS. 1 to 4. Therefore, extension of the cylinders 90 urges the base portion 104 of the stand assembly 100 against the floor or the ground to thereby prevent any further substantial rocking of the lift frame assembly 60 upwardly about the pivots 68 and 69. Any further extension of the cylinders 90 will therefore cause the rear basket support posts 20 to rock in the clockwise direction, primarily about the pivot 68 which is substantially fixed in position by operation of the stand assembly 100.

Each cross auger stand 102 includes an upright plate member 150 connected by bolts 152 to the cross auger frame 74 and having a lower rounded base portion 156 which rests upon the ground. The stands 102 support the cross auger frame generally a preselected distance above the surface of the ground during mounting and dismounting of the harvester. The rounded base portions 156 permit the stands to slide fore-and-aft as the cylinders 90 are extended and retracted since the distance between the forward base portion 104 of the stand assembly 100 and the base portion 156 of the rear stands 102 changes as the relative position between the harvesting and conveying assembly 56 and the basket 16 changes.

Figure 2:
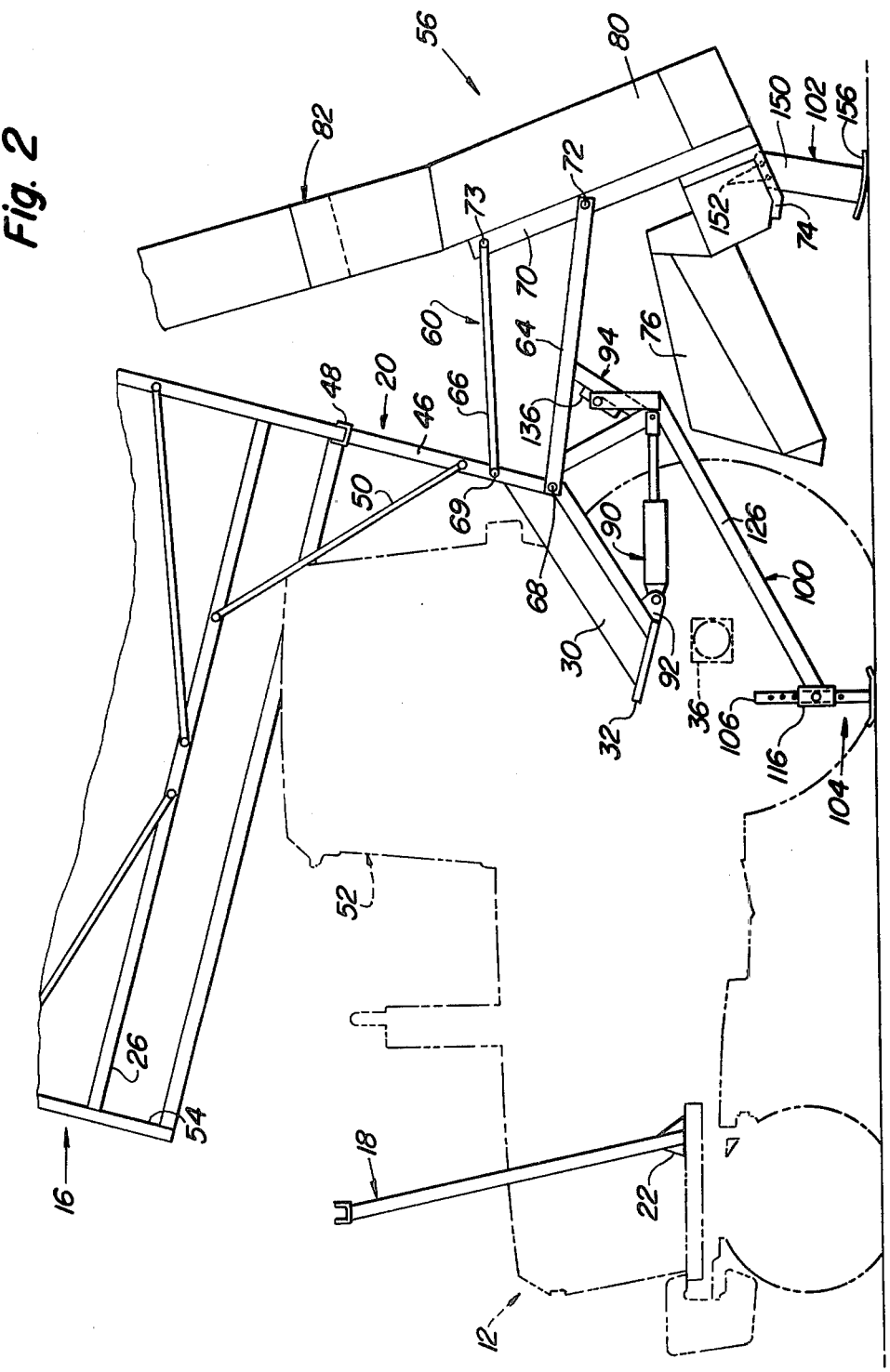
FIG. 2 is a view (slightly exaggerated), similar to FIG. 1, showing the lift cylinders extended and the rear basket posts rocked rearwardly to a dismounting position so that the tractor can be driven forwardly from under the basket without interference from the harvester.
Figure 3:
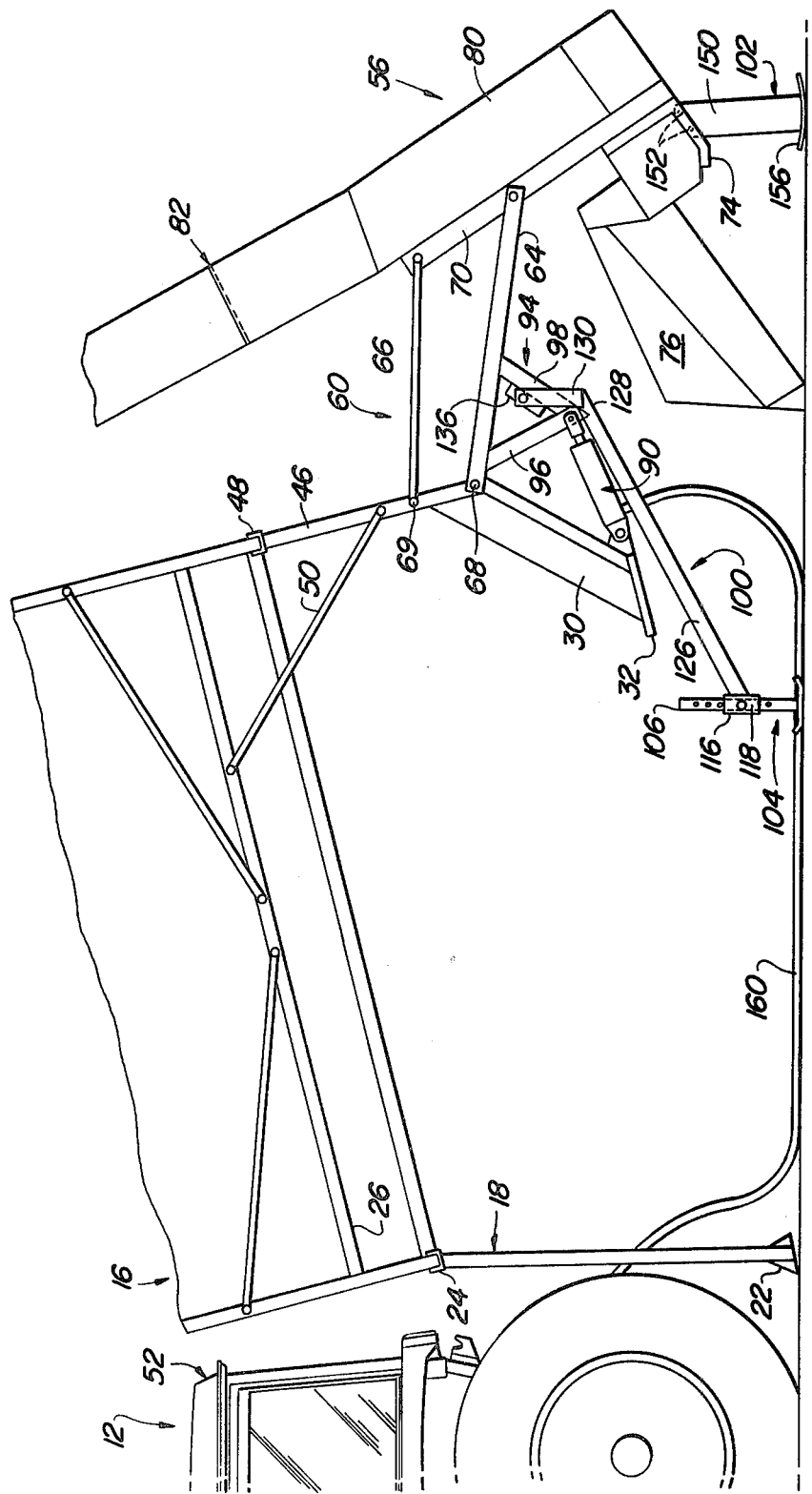
FIG. 3 is a side view of the harvester, similar to FIGS. 1 and 2, with the tractor removed therefrom and the harvester in its storage position resting on the front basket posts.

During harvesting, the forward and rear stands 100 and 102 are completely removed, and the harvester 10 operates in the manner as set forth in U.S. Pat. No. 4,348,856. When the harvesting season is over, or when it is desired to free up the tractor 12 for a use other than harvesting, the tractor and harvester are driven to a storage location. The harvesting and conveying structure 56 is raised sufficiently by extending the cylinders 90 to position the rear stands 102 under the cross auger frame 74. The stands 102 are bolted to the frame, and the cylinders 90 are retracted so that the weight of the cross auger frame 74 is supported on the stands 102. The forward stand assembly 100 is then positioned under the tractor axle 36 so the axle is unobstructed in the forward direction, and the keeper block 136 is pinned above the arm 98 of the cylinder bracket 94 by the pin 138. The tubular beams 106 are adjusted downwardly in the respective tubular brackets 116, and the pins 122 are inserted to fix the base portion 104 with respect to the diagonal beam 126. An extension hose 160 is connected between the cylinders 90 which are plumbed in parallel, and the source of pressurized fluid on the tractor 12. The forward pairs of bolts 38 are removed from each set of plate members 32, 42, and the rear pairs of bolts 40 are loosened or removed so that the upper plate member 32 can tilt away from the axle 36 upon further extension of the cylinders 90 from the position shown in FIG. 1. The forward basket posts 18 are unpinned at 24 from the front of the basket frame 26, and the power take-off shaft (not shown), as well as any cables or other hydraulic hoses extending between the tractor and the harvesting and conveying structure 56 are removed. The remainder of the harvester 10 remains intact. With the stands 100 and 102 in place as shown in FIG. 1, the operator applies pressure to the cylinders 90 to extend the cylinders and cause the rear basket posts 20 to pivot in the clockwise direction (FIG. 2) generally about the pivotal connections 68 of the lower support beams 64 with the rear basket posts 20. The cylinders 90 are extended until substantially all of the weight of the harvester 10 is removed from the tractor axle 36 and the front portion of the basket 16 is raised sufficiently so that the cab 52 of the tractor 12 is completely unobstructed in the forward direction. The view in FIG. 2 is slightly exaggerated to show the relative movements of the components more clearly, but in the preferred embodiment the basket 16 is rotated approximately eight degrees, and the rear of the plate 32 remains in close proximity to the axle 36. As the basket 16 is tilted in the clockwise direction, the air duct system 80 decreases in length as the portion 82 telescopes inwardly. Also, as the basket 16 tilts upwardly, the rear support stands 102 will slide forwardly slightly as the upper control links 66 rock the upright support beams 70 in the clockwise direction generally about the pins 72. The entire weight of the harvester 10 is supported on the forward stand assembly 100 and the rear stands 102. The weight of the rear harvesting and conveying structures 56 provides a center of gravity for the tractor-mounted harvester 10 rearwardly of the front portion of the forward stand assembly 100 so that the entire harvester structure with the stands attached is completely self-supportive in the position shown in FIG. 2. The tractor 12 is now completely unobstructed in the forward direction so that the operator may freely drive the tractor forwardly under the lowermost basket portion 54 and clear of the forward portion of the basket 16. The extension hose 160 is of sufficient length so that the cylinders 90 remain connected to the source of hydraulic fluid pressure on the tractor as the operator drives the tractor clear of the harvester 10. Once the tractor is clear, the operator removes the two forward basket support posts 18 from the tractor frame and reconnects them to the frame at locations 24. The posts 18 are rotated 180 degrees about their longitudinal axes so that they angle rearwardly in the upward direction rather than forwardly as shown in FIG. 1. The operator then moves the control lever on the tractor to retract the cylinders 90 and tilt the basket 16 downwardly (FIG. 3) until the lower ends 22 of the posts 18 contact the ground or the floor. The air duct system 80 extends at the telescoping portion 82, and the rear stands 102 slide rearwardly as the rear basket posts pivot generally about the pivotal connections 68. Once the basket is in the storage position shown in FIG. 3, the operator disconnects the extension hose 160, and the tractor 12 is free for other use.

When the time comes to mount the harvester 10 on the tractor 12, the above procedure is reversed. The operator backs the tractor to the position shown in FIG. 3 and attaches the extension hose 160 to the source of hydraulic pressure. The cylinders 90 are extended to raise the lowermost portion 54 of the basket 16 clear of the top of the tractor cab 52. The front posts 18 are removed from the basket frame 26, and the operator backs the tractor under the basket until the plate member 32 attached to the rear posts 20 is directly over the axle 36. The operator then bolts the forward basket support posts 18 in the position shown in FIG. 2 and retracts the cylinders 90 until the plate 32 rests on the axle 36 and the front portion of the basket frame 26 is positioned for pinning to the upper portion of the basket posts 18 at 24. The bolts 38 and 40 are then tightened between the plate members 32 and 42 to secure the rear basket posts 20 to the tractor axle 36. The rear support stands 102 are then unbolted from the cross auger frame 74, and the forward stand assembly 100 is removed by unpinning the keeper block 136 from the plate members 130. The extension hose 160 is removed, and the cables and power take-off shafts are reattached.

Therefore, from the above one can see that the present invention provides for convenient mounting and dismounting of the harvester 10 with relatively little disassembly of the harvester itself. Since relatively inexpensive stand structure is utilized with an existing hydraulic power system, much of the expense associated with mounting and dismounting a tractor-mounted harvester is eliminated. A single operator can mount or dismount the harvester 10 in a relatively short period of time without large, expensive equipment.

Having described the preferred embodiment, it will be apparent that modifications can be made without departing from the scope of the invention as defined in the accompanying claims.

I claim:

1. In a tractor-mounted harvester having a crop receptacle mounted above the tractor on upright support members normally fixed to the tractor frame, a lift assembly connected for rocking vertically with respect to the upright support members, harvesting structure connected to and rockable with the lift assembly, and activatable power means connected to the lift assembly for vertically rocking the lift assembly and harvesting structure with respect to the tractor frame, means for lifting the crop receptacle from the tractor and providing a generally unobstructed path for the tractor in one of the fore-and-aft directions, said means for lifting comprising:

attaching means for selectively releasing the upright support members from the tractor frame;

stand means selectively attachable to the lift assembly, said stand means in the attached position extending downwardly from the lift assembly to a ground-contacting portion, and preventing substantial vertical rocking of the lift assembly when the power means is activated and the attaching means is released for rocking the upright support member and crop receptacle relative to the lift assembly between mounted and dismounting positions, wherein in the dismounting position, the crop receptacle is positioned away from the tractor path.

2. The invention as set forth in claim 1 wherein the lift assembly is pivotally connected to a least one of the upright support members, and the power means comprises a hydraulic cylinder connected between said last-mentioned one of the upright support members and the lift assembly, wherein said hydraulic cylinder, when activated with the stand means attached, causes said at least one of the upright support members to rock about the pivotal connection of said member with the lift assembly.

3. The invention as set forth in claim 2 wherein the lift assembly extends rearwardly of the tractor body, and the stand means is connected to the lift assembly adjacent the cylinder, said stand means extending downwardly and forwardly therefrom to said ground-contacting portion, and wherein the ground-contacting portion is located forwardly of the center of gravity of the harvester.

4. The invention as set forth in claim 1 further comprising additional atand means connected to the harvesting structure for supporting the harvesting structure above the ground as the support members are rocked and when the crop receptacle is in the dismounting position.

5. The invention as set forth in claim 2 including two of said upright support members normally fixed to the tractor axle and two cylinders connected to the respective support members, wherein said cylinders, when activated with the stand means attached, cause said two upright support members to rock upwardly from the axle about the pivotal connections of said members with the lift assembly.

6. The invention as set forth in claim 1 further comprising a bracket connected to the lift assembly, and means for releasably securing the stand means to the bracket.

7. The invention as set forth in claim 6 wherein the activatable power means comprises a hydraulic cylinder having a first end connected to said bracket and a second end connected to at least one of the support members.

8. The invention as set forth in claim 2 further comprising hydraulic line extending means for connecting the cylinder to a source of hydraulic pressure on the tractor and permitting the tractor to be driven out from under the crop receptacle when in the dismounting position while the cylinder remains connected to said source, said line extending means thereby permitting the rocking downwardly of the crop receptacle to the storage position when the tractor is out from under the receptacle.

9. The invention as set forth in claim 8 further comprising basket storage post means for preventing the basket from rocking downwardly beyond a preselected storage position when the tractor is out from under the receptacle.

10. The invention as set forth in claim 9 wherein said storage post means includes additional upright support members selectively attachable between the receptacle and the tractor frame for supporting the receptacle in the mounted position.

11. The invention as set forth in claim 2 wherein the upright support members comprise a pair of transversely spaced rear support posts connected to the aft end of the receptacle, said support member attaching means for selectively attaching and releasing said support posts to and from the aft end of the tractor.

12. A method for dismounting a tractor-mounted crop harvester, wherein the tractor includes a fore-and-aft extending frame supported for forward movement over the ground by drive wheels, and wherein the harvester includes a receptacle supported above the tractor body by upright support members connected to the body, a lift assembly rockably connected to the support members adjacent one end of the tractor body for rocking in generally a vertical plane, harvesting structure connected for rocking with the lift assembly, and operable power means connected between the support members and the lift assembly for rocking the lift assembly, said method comprising:

attaching ground support means to the lift assembly to prevent substantial vertical rocking of the lift assembly;

disconnecting the upright support members from the tractor frame;

after the steps of attaching and disconnecting, operating the power means to thereby cause the upright support members and therefore the receptacle to rock away from the tractor body and out of interfering relationship with the tractor in a preselected direction; and driving the tractor out from under the receptacle in the preselected direction.

13. The method as set forth in claim 12 further including the step of supporting the rocked receptacle on the ground support means as the tractor is driven out from under the receptacle.

14. The method as set forth in claim 12 wherein the step of operating the power means comprises supplying pressure to a hydraulic cylinder connected between one of the upright support members and the lift assembly, and rocking the support member with respect to the lift assembly generally about a transverse pivotal axis to raise the receptacle with respect to the tractor frame.

15. The method as set forth in claim 13 wherein the step of attaching includes providing ground support on the preselected direction side of the center of gravity of the harvester.

16. The method as set forth in claim 14 wherein the harvesting structure is connected to the lift assembly and the step of operating the power means includes supplying pressure to a harvesting structure lift cylinder connected between the upright support member and the lift assembly.

17. The method as set forth in claim 16 wherein the step of operating the power means includes connecting an extension fluid supply line between a source of fluid pressure on the tractor and the lift cylinder to permit said cylinder to remain connected to the source of fluid pressure during the step of driving the tractor out from under the receptacle.

18. The method as set forth in claim 17 further including, after the step of driving the tractor, operating the lift cylinder to rock the receptacle to a storage position.

19. The method as set forth in claim 16 further including the steps of supporting the harvesting structure on stand members and permitting the harvesting structure to remain connected to the lift assembly during the steps of operating the power means and driving the tractor out from under the receptacle.

20. In a harvester adapted for mounting on tractor having axle-mounted wheels for propelling the tractor forwardly over the ground, said harvester including a fore-and-aft extending crop receptacle, first and second upright support members connected to forward and rearward portions, respectively, of the tractor for supporting the fore-and-aft ends, respectively, of the crop receptacle above the tractor, a lift assembly having a first end pivotally connected to the second upright support member for rocking vertically about a generally horizontal axis, rearwardly disposed harvesting means connected to the opposite end of the lift assembly for rocking therewith generally behind the tractor, and activatable hydraulic cylinder means connected between the lift assembly and the second upright support member for rocking the former with respect to the latter about the axis, means for lifting the crop receptacle from the tractor and providing a generally unobstructed path for the tractor in the forward direction, comprising:
bracket means for selectively connecting the second upright support member to and disconnecting said member from the tractor; and
support means preventing the lift assembly from rocking with respect to the ground as the cylinder means is activated and causing the second upright member, when disconnected from the tractor, to rock in generally a vertical plane with respect to the lift assembly for rocking the receptacle therewith upwardly out of interfering relationship with the tractor in the forward direction.

21. The invention as set forth in claim 20 wherein the support means comprises a stand assembly releasably securable to the lift assembly, said stand assembly including a lower base portion adapted for support on the ground under the rear portion of the tractor and forward of the center of gravity of the harvester, a beam extending upwardly and rearwardly from the base portion, means securing the upper end of the beam to the lift assembly and substantially fixing said lift assembly in a preselected attitude with respect to the ground for supporting the harvester on the base portion when the receptacle is rocked upwardly.

22. The invention as set forth in claim 21 further comprising ground support means connected to the harvesting means for supporting the latter on the ground when the receptacle is rocked upwardly.

23. The invention as set forth in claim 21 wherein the second support member includes a pair of transversely spaced rear receptacle posts and wherein the bracket means includes a pair of mounting brackets located at the lower ends of the posts adapted for mounting on the rear tractor axle, said lift assembly including a pair of main support beams pivotally connected to the respective posts, and wherein said beam comprises a pair of transversely spaced beam members connected at their upper ends to the respective main support beams, said beam members providing transverse stability for the harvester when the receptacle is rocked upwardly.

24. The invention as set forth in claim 23 wherein the transversely spaced beam members extend below and rearwardly of the tractor axle.

25. The invention as set forth in claim 24 further comprising extension hose means connected between a source of activating fluid on the tractor and the hydraulic cylinder means for permitting the tractor to be driven forwardly out from under the upwardly rocked receptacle while the cylinder means remains connected to the source of fluid.

26. The invention as set forth in claim 25 further comprising means for disconnecting the first upright support member from the tractor, said means permitting said first support member to be attached to the forward portion of the receptacle, and wherein said extension hose means permits the cylinder means to be activated to rock the receptacle dowwardly, when the tractor is out from under the receptacle, to a storage position wherein said receptacle rests on the upright support member.

27. A mounting method for a tractor-mounted crop harvester, wherein the tractor includes a fore-and-aft extending body supported for forward movement over the ground by axle-supported drive wheels, and wherein the harvester includes a fore-and-aft extending receptacle supported above the tractor body by front and rear upright support members connected to the body, a lift assembly rockably connected to the rear upright support members for rocking in generally a vertical plane aft of the tractor body, harvesting structure connected to the lift assembly, and operable power means connected between the rear upright support members and the lift assembly for rocking the lift assembly and harvesting structure between transport and field-working positions, said method comprising:
preventing substantial vertical rocking of the lift assembly as the power means is operated by attaching support structure to the lift assembly;
disconnecting the rear upright support members from the tractor body;
rocking the receptacle upwardly from the tractor body and out of interfering relationship with the tractor in the forward direction by operating the power means with the support structure attached; and
driving the tractor out from under the receptacle in the forward direction.

28. The method as set forth in claim 27 further including the step of supporting the rocked receptacle on the support structure as the tractor is driven out from under the receptacle.

29. The method as set forth in claim 27 wherein the step of rocking the receptacle upwardly comprises supplying pressure to a hydraulic lift cylinder connected between one of the rear upright support members and the lift assembly, and rocking the support member rearwardly with respect to the lift assembly generally about a transverse pivotal axis to raise the forward end of the receptacle with respect to the tractor body.

30. The method as set forth in claim 28 wherein the step of preventing vertical rocking of the lift assembly includes providing ground-contacting base portion on the support structure forwardly of the center of gravity of the harvester.

31. The method as set forth in claim 29 wherein the step of operating the power means includes supplying pressure to the hydraulic lift cylinder while the harvesting structure remains connected to the lift assembly.

32. The method as set forth in claim 31 wherein the step of operating the power means includes connecting an extension fluid supply line between a source of fluid pressure on the tractor and the lift cylinder to permit said cylinder to remain connected to the source of fluid pressure during the step of driving the tractor out from under the receptacle.

33. The method as set forth in claim 32 further including, after the step of driving the tractor, rocking the receptacle downwardly to a storage position.

34. The method as set forth in claim 31 further including the step of supporting the harvesting structure on stand members and permitting the harvesting structure to remain connected to the lift assembly during the step of driving the tractor out from under the receptacle.

35. The method as set forth in claim 33 further including, after the step of rocking the receptacle downwardly, rocking the receptacle upwardly by operating the lift cylinder and thereafter backing the tractor under the upwardly rocked receptacle.

36. The method as set forth in claim 27 wherein the step of rocking the receptacle includes rocking the receptacle upwardly from the tractor body so that the distance above the ground of the lowermost extremity of the forward end of the receptacle is approximately equal to, but slightly greater than, the distance above the ground of the aft end of the tractor body.

37. The method as set forth in claim 27 wherein the step of rocking the receptacle includes rocking the receptacle on the order of eight degrees upwardly from its attached tractor-supported position.

38. The method as set forth in claim 27 further including the steps of backing the tractor under the upwardly rocked receptacle, and rocking the receptacle downwardly unto the tractor body.

* * * * *

UNITED STATES PATENT AND TRADEMARK OFFICE
CERTIFICATE OF CORRECTION

PATENT NO.   :   4,483,131

DATED        :   20 November 1984

INVENTOR(S)  :   Francis Edward Schlueter

It is certified that error appears in the above-identified patent and that said Letters Patent is hereby corrected as shown below:

Column 7, line 42, delete "therefrom" and insert -- from the lift assembly --; and line 47, delete "atand" and insert -- stand --.

Signed and Sealed this

Second Day of July 1985

[SEAL]

Attest:

DONALD J. QUIGG

Attesting Officer     Acting Commissioner of Patents and Trademarks